United States Patent
Namba et al.

(10) Patent No.: US 10,001,844 B2
(45) Date of Patent: Jun. 19, 2018

(54) INFORMATION PROCESSING APPARATUS INFORMATION PROCESSING METHOD AND STORAGE MEDIUM

(71) Applicant: CANON KABUSHIKI KAISHA, Tokyo (JP)

(72) Inventors: Nobutoshi Namba, Tokyo (JP); Kazuki Takemoto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/257,415

(22) Filed: Sep. 6, 2016

(65) Prior Publication Data
US 2017/0083104 A1    Mar. 23, 2017

(30) Foreign Application Priority Data
Sep. 17, 2015 (JP) ................... 2015-184523

(51) Int. Cl.
*G06F 3/00* (2006.01)
*G06F 3/01* (2006.01)
*G06T 19/00* (2011.01)
*G06F 3/02* (2006.01)
*G02B 27/01* (2006.01)

(52) U.S. Cl.
CPC ........... *G06F 3/017* (2013.01); *G02B 27/017* (2013.01); *G06F 3/0219* (2013.01); *G06T 19/006* (2013.01)

(58) Field of Classification Search
CPC ..... G06F 3/0219; G06F 3/017; G06T 19/006; G02B 27/017
See application file for complete search history.

(56) References Cited

U.S. PATENT DOCUMENTS

| | | | | |
|---|---|---|---|---|
| 2013/0187835 | A1* | 7/2013 | Vaught | G06K 9/00604 345/8 |
| 2013/0257751 | A1* | 10/2013 | Stafford | G06F 3/0488 345/173 |
| 2014/0285404 | A1* | 9/2014 | Takano | G06F 3/005 345/8 |

FOREIGN PATENT DOCUMENTS

JP    2009-217834 A    9/2009

* cited by examiner

*Primary Examiner* — Muhammad N Edun
(74) *Attorney, Agent, or Firm* — Canon U.S.A., Inc., IP Division

(57) ABSTRACT

An information processing apparatus includes a first identification unit that identifies an input device to be used to execute a task, the input device lying in a field of view range of a user wearing a display device, a second identification unit that identifies an operation medium with which the user operates the input device, the operation medium lying in the field of view range of the user, a determination unit that determines processing to be executed based on the identified input device and the identified operation medium, and a display control unit that causes the display device to display an image corresponding to the determined processing.

19 Claims, 13 Drawing Sheets

FIG.4

| INPUT DEVICE | | OPERATION MEDIUM | | TARGET TASK |
|---|---|---|---|---|
| IDENTIFICATION INFORMATION | PRESCRIBED DISTANCE | IDENTIFICATION INFORMATION | PRESCRIBED DISTANCE | |
| KEYBOARD TEMPLATE | 10 - 50 | R: 137-251, G: 88-240, B: 64-232 | 10 - 50 | TEXT INPUT |
| CONTROLLER TEMPLATE | 10 - 40 | R: 137-251, G: 88-240, B: 64-232 | 10 - 50 | CG ADJUSTMENT |

FIG.11

| INPUT DEVICE | | OPERATION MEDIUM | | TARGET TASK |
|---|---|---|---|---|
| IDENTIFICATION INFORMATION | PRESCRIBED DISTANCE | IDENTIFICATION INFORMATION | PRESCRIBED DISTANCE | |
| TARGET 1 | 10 - 50 | TARGET 7 | 10 - 50 | TEXT INPUT |
| TARGET 2 | 10 - 40 | TARGET 7 | 10 - 50 | CG ADJUSTMENT |

FIG.13

| INPUT DEVICE | | OPERATION MEDIUM | | | PRESCRIBED TIME | TARGET TASK |
|---|---|---|---|---|---|---|
| IDENTIFICATION INFORMATION | PRESCRIBED DISTANCE | IDENTIFICATION INFORMATION | PRESCRIBED DISTANCE | | | |
| KEYBOARD TEMPLATE | 10 - 50 | R: 137-251, G: 88-240, B: 64-232 | 10 - 50 | | > 3 | TEXT INPUT |
| KEYBOARD TEMPLATE | 10 - 50 | R: 137-251, G: 88-240, B: 64-232 | 10 - 50 | | ≤ 3 | CG COMMENT |
| CONTROLLER TEMPLATE | 10 - 70 | R: 137-251, G: 88-240, B: 64-232 | 10 - 50 | | > 0 | CG ADJUSTMENT |

INFORMATION PROCESSING APPARATUS INFORMATION PROCESSING METHOD AND STORAGE MEDIUM

BACKGROUND

Field

Aspects of the present invention generally relate to an information processing apparatus, an information processing method, and a storage medium.

Description of the Related Art

Mixed reality (MR) techniques and virtual space (virtual reality (VR)) techniques using a head mounted display (HMD) have heretofore been studied. A system using an MR technique or VR technique needs to execute a single task as well as have flexibility to switch a plurality of tasks. Switching of tasks involves switching of target applications. If the target applications need to be switched through operation of an input device such as a keyboard, it is difficult for a person experiencing an MR technique or VR technique to accurately operate the input device while wearing the HMD. The person thus has to dismount and re-mount the HMD when switching applications. However, dismounting and re-mounting the HMD while experiencing an MR system or VR system impairs the sense of immersion and lowers the efficiency of task execution.

Studies have recently been conducted on methods for switching target applications without a need for a user's instruction operation on an input device, whereby the user experiencing an MR system or VR system can switch the target applications while wearing the HMD. Examples of such methods include a method based on a virtual input system using a gesture recognition technique and a method based on an object recognition input system using a shape recognition technique such as a pattern matching technique. Japanese Patent Application Laid-Open No. 2009-217834 discusses a technique for recognizing a pattern of a two-dimensional code from a captured image of the two-dimensional code, and starting processing corresponding to the recognized pattern.

According to the technique discussed in Japanese Patent Application Laid-Open No. 2009-217834, if a two-dimensional code is accidentally captured in an image, applications are automatically switched based on the misrecognition that the user desires to switch tasks. In other words, there may arise an issue that applications can be switched at timing not intended by the user, and an issue that an application may fail to be appropriately switched to one desired by the user.

SUMMARY

Aspects of the present invention are directed to appropriately determining switching of tasks with the user wearing the HMD and without a switching instruction operation by the user.

According to an aspect of the present invention, an information processing apparatus includes a first identification unit configured to identify an input device to be used to execute a task, the input device lying in a field of view range of a user wearing a display device, a second identification unit configured to identify an operation medium with which the user operates the input device, the operation medium lying in the field of view range of the user, a determination unit configured to determine processing to be executed based on the identified input device and the identified operation medium, and a display control unit configured to cause the display device to display an image corresponding to the determined processing.

According to another aspect of the present invention, switching of tasks can be appropriately determined with the user wearing the HMD and without a switching instruction operation by the user.

Further features of aspects of the present invention will become apparent from the following description of exemplary embodiments with reference to the attached drawings.

BRIEF DESCRIPTION OF THE DRAWINGS

FIG. 4 illustrates an example of a condition setting table.

FIG. 11 illustrates an example of a condition setting table.

FIG. 13 illustrates an example of a condition setting table.

DESCRIPTION OF THE EMBODIMENTS

Exemplary embodiments of the present invention will be described in detail below with reference to the accompanying drawings.

The following exemplary embodiments are mere examples of the means for carrying out aspects of the present invention. Changes or modifications can be made as appropriate depending on a configuration and various conditions of an apparatus to which aspects of the present invention is applied. Aspects of the present invention are not limited to the following exemplary embodiments.

Figure 1:
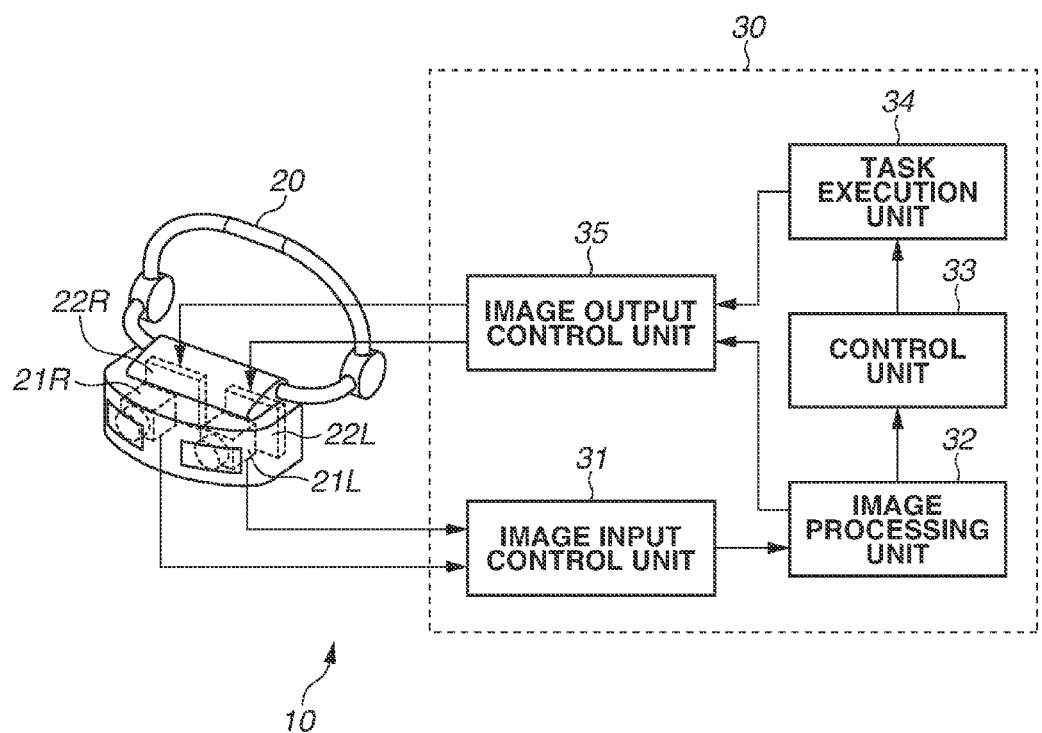
FIG. 1 is a diagram illustrating a configuration example of a mixed reality (MR) system according to a first exemplary embodiment.

FIG. 1 is a diagram illustrating a configuration example of a mixed reality (MR) system 10 including an information processing apparatus 30 according to a first exemplary embodiment.

The MR system 10 includes a head mounted display (HMD) 20 and the information processing apparatus 30. The MR system 10 is a system using a technique of mixing a real space with a virtual space and presenting the resultant to a user experiencing the MR system. The MR system 10 can present the user with an object that does not actually exist, such as a computer-aided design (CAD) model, as if such an object actually exists. The MR system 10 can be applied to various fields including a manufacturing field and a medical field. For example, in the manufacturing field, the MR system 10 can be used for checking a design in a design phase, or for supporting assembly by displaying a procedure in an assembly phase. In the medical field, the MR system 10 can be used for supporting an operation by displaying a state inside a patient's body on the surface of the patient's body.

The HMD 20 is a head mounted display that the user can wear on the user's head. The HMD 20 according to the present exemplary embodiment is a video see-through type HMD that includes an image capturing function capable of capturing an image of a real space from the user's point of view and can present the user with a combined image obtained by combining a real image with a virtual space image such as computer graphics (CG). The HMD 20 includes imaging units 21L and 21R, and display units 22L and 22R. The imaging units 21L and 21R include a camera arranged to correspond to the user's left eye and a camera arranged to correspond to the user's right eye, respectively. The imaging units 21L and 21R capture images (field of view images) in a direction of the user's eyes from a plurality of point of view positions corresponding to the user's left and right eyes. In other words, the imaging units 21L and 21R capture the images of an object (real object) in the real space as viewed from the user's point of view. The two cameras included in the imaging units 21L and 21R constitute a stereoscopic camera. The imaging units 21L and 21R output the respective captured images to the information processing apparatus 30. Internal camera parameters of the stereoscopic camera, such as a focal length and a lens distortion coefficient, are determined by a predetermined method and known in advance.

The display units 22L and 22R include a display arranged to correspond to the user's left eye and a display arranged to correspond to the user's right eye, respectively. The display units 22L and 22R display combined images output from the information processing apparatus 30. More specifically, the display unit 22L presents a combined image for the left eye in front of the user's left eye. The display unit 22R presents a combined image for the right eye in front of the user's right eye. The display units 22L and 22R can include an optical system for guiding the images on the displays to the eyeballs, respectively. The arrangement positions of the imaging units 21L and 21R and the display units 22L and 22R are not limited to the positions illustrated in FIG. 1 as long as the imaging units 21L and 21R are configured to be able to capture the field of view images of the user and the display units 22L and 22R are configured to be able to present images to the user.

The information processing apparatus 30 inputs the images of the real space output from the imaging units 21L and 21R of the HMD 20, and generates combined images of the input images and images of a virtual space. The information processing apparatus 30 then outputs the generated combined images to the display units 22L and 22R of the HMD 20. The information processing apparatus 30 determines a task that the user is attempting to start (an operation that the user wants to execute) based on the images output from the imaging units 21L and 21R, and activates an appropriate application for executing the determined task.

Based on the images output from the imaging units 21L and 21R, the information processing apparatus 30 recognizes an input device used to execute a task, the input device lying in a field of view range of the user, and an operation medium for the user to operate the input device, the operation medium lying in the field of view range of the user. The information processing apparatus 30 detects a position and orientation of the user's head on which the HMD 20 is mounted, i.e., the position and orientation of the HMD 20.

The information processing apparatus 30 detects a distance (first distance) from a point of view position of the user to the input device based on the position and orientation of the user's head. The information processing apparatus 30 further detects a distance (second distance) from the point of view position of the user to the operation medium based on the position and orientation of the user's head. The information processing apparatus 30 then compares the detected distances with respective determination parameters to determine a next task to be executed, and activates an application for executing the determined task.

As illustrated in FIG. 1, the information processing apparatus 30 includes an image input control unit 31, an image processing unit 32, a control unit 33, a task execution unit 34, and an image output control unit 35.

The image input control unit 31 controls an image input unit 308, illustrated in FIG. 2 and described below, and obtains the images in the direction of the user's eyes captured from the point of view positions of the user by the imaging units 21L and 21R. The information processing apparatus 30 performs lens distortion correction on the images obtained by the image input control unit 31, and handles the resulting images as having no distortion. The image processing unit 32 detects the position and orientation of the HMD 20 based on a standard coordinate system prescribed in the real space, and superimposes virtual contents on a position consistent with the position and orientation of the HMD 20 in the images obtained by the image input control unit 31. The image processing unit 32 thereby generates combined images.

The position and orientation of the HMD 20 on the standard coordinate system can be detected from stereoscopic images captured by the imaging units 21L and 21R. The position and orientation of the HMD 20 can be detected based on information about a position and orientation sensor (not illustrated). The position of the contents can be uniquely determined from the detection result of the position and orientation of the HMD 20. The image processing unit 32 outputs the generated images to the control unit 33 and the image output control unit 35.

The control unit 33 inputs information (image information) about the images generated by the image processing unit 32, executes task determination processing based on the input image information, and outputs the result of the task determination processing to the task execution unit 34. For example, if the control unit 33 recognizes a keyboard for inputting characters as an input device and determines that the task to be executed is a text input task, the control unit 33 outputs to the task execution unit 34 an activation instruction for a character input application for inputting characters. The text input task is a task where the user operates the keyboard to generate text. If the control unit 33 recognizes, for example, a controller including buttons for inputting instructions as an input device and determines that the task to be executed is a CG adjustment task, the control unit 33 outputs to the task execution unit 34 an activation instruction for a CG adjustment application for adjusting CG. The CG adjustment task is a task where the user operates the controller to move virtual contents displayed on the display units 22L and 22R of the HMD 20. The movement of virtual contents includes a move in three-dimensional directions and a rotation in the three-dimensional directions. Details of the task determination processing will be described below.

The task execution unit 34 activates an application corresponding to the task to be executed, based on the result of the task determination processing of the control unit 33. The task execution unit 34 generates images related to the application for which the activation instruction is received from the control unit 33, and outputs the images to the image output control unit 35. The image output control unit 35 controls an image output unit 307, illustrated in FIG. 2 and described below, and thereby outputs the images generated by the image processing unit 32 and the task execution unit 34 to the display units 22L and 22R of the HMD 20. In other words, the image output control unit 35 causes the HMD 20 to display the combined images of the real space images and the virtual space images, and causes the HMD 20 to display information according to the task determined by the control unit 33.

Figure 2:
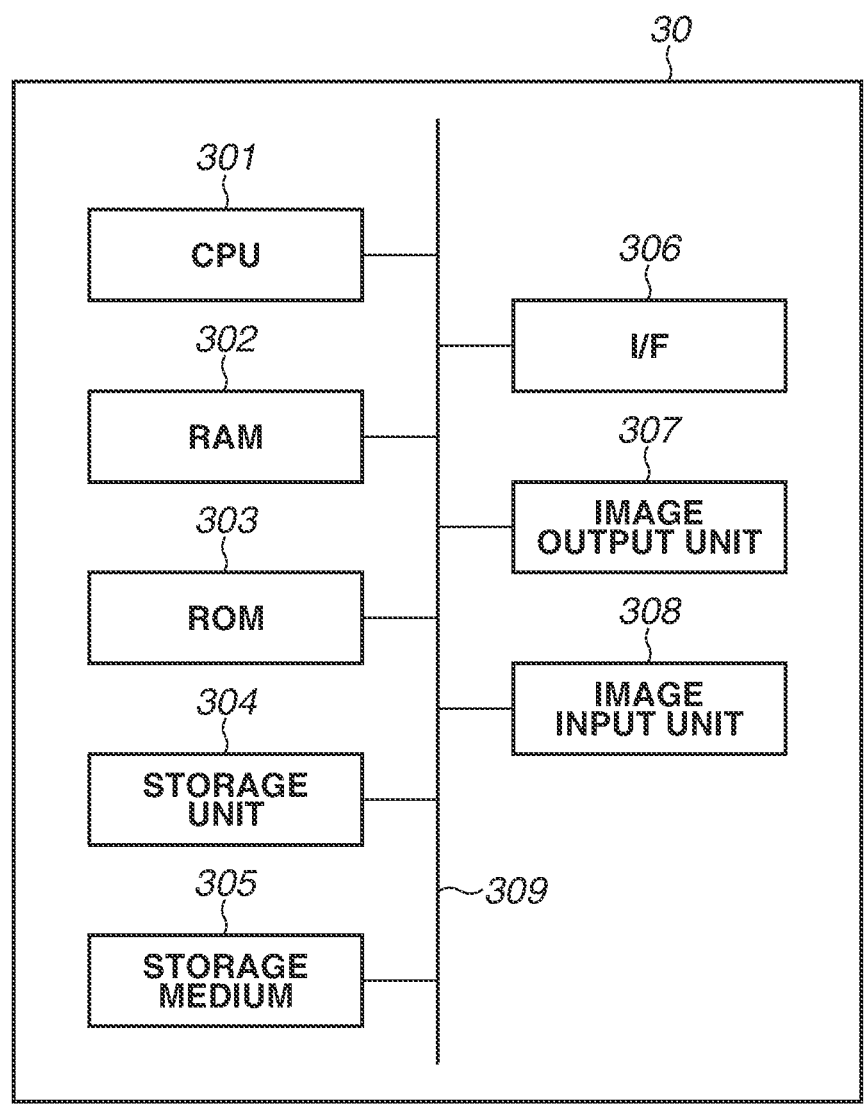
FIG. 2 is a diagram illustrating a hardware configuration example of an information processing apparatus.

FIG. 2 illustrates an example of a hardware configuration of the information processing apparatus 30. The information processing apparatus 30 includes a central processing unit (CPU) 301, a random access memory (RAM) 302, a read-only memory (ROM) 303, a storage unit 304, a storage medium 305, an interface (I/F) 306, the image output unit 307, the image input unit 308, and a system bus 309.

The CPU 301 controls operation of the information processing apparatus 30. The CPU 301 controls the components (302 to 308) via the system bus 309. The RAM 302 functions as a main memory and a work area of the CPU 301. The ROM 303 is a nonvolatile memory that stores a program needed for the CPU 301 to execute processing. The program can be stored in the RAM 302, the storage unit 304, or the storage medium 305. When executing processing, the CPU 301 loads the needed program, for example, from the ROM 303 into the RAM 302, and executes the program to implement various functions and operations.

The storage unit 304 and the storage medium 305 store, for example, various types of data and various types of information that are needed when the CPU 301 performs processing using the program. The storage unit 304 and the storage device 305 can store various types of data and various types of information that are obtained by the CPU 301 performing processing using the program. The I/F 306 includes an interface card, and communicates with external devices. More specifically, the I/F 306 receives various types of sensor information and specific input information from input devices (such as a mouse, keyboard, gaming controller, etc.), and transmits and receives images to/from the HMD 20.

The image output unit 307 outputs images to the HMD 20. The image output unit 307 is controlled by the image output control unit 35. The image output unit 307 includes, for example, a graphics card intended for a workstation, and can output images to the display units 22L and 22R of the HMD 20 in an appropriate format. The image input unit 308 takes in images captured by the HMD 20. The image input unit 308 is controlled by the image input control unit 31 illustrated in FIG. 1, and includes, for example, a video capture board or a video capture card. The image input unit 308 can be configured to take in an image captured by a camera. The system bus 309 connects the CPU 301, the RAM 302, the ROM 303, the storage unit 304, the storage medium 305, the I/F 306, the image output unit 307, and the image input unit 308 in a communicable manner.

Figure 3:
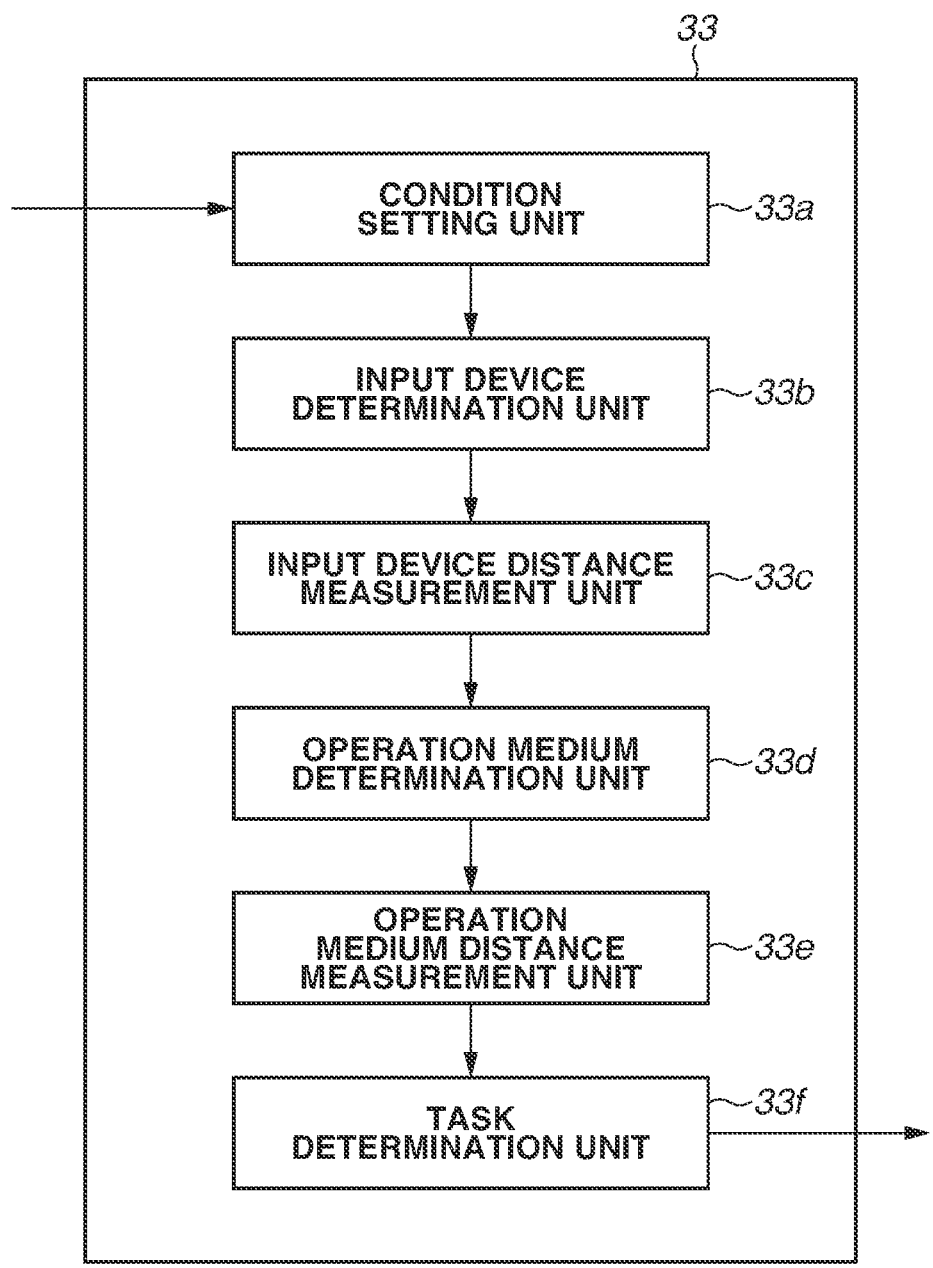
FIG. 3 is a functional block diagram illustrating a control unit of the information processing apparatus.

FIG. 3 is a functional block diagram illustrating the control unit 33. The control unit 33 includes a condition setting unit 33a, an input device determination unit 33b, an input device distance measurement unit 33c, an operation medium determination unit 33d, an operation medium distance measurement unit 33e, and a task determination unit 33f.

The condition setting unit 33a reads a condition setting table that is stored in advance in at least one of the ROM 303, the RAM 302, the storage unit 304, or the storage medium 305 illustrated in FIG. 2. FIG. 4 illustrates an example of the condition setting table. As illustrated in FIG. 4, the condition setting table stores combinations of input devices and operation media, and tasks (target tasks) that are associated with the combinations and can be executed by the user.

The condition setting table also stores identification information for identifying the input devices, and prescribed distances (first prescribed distances) set for respective types of input devices in advance. A first prescribed distance is a distance between the HMD 20 and an input device where the user can be determined to have an intention of executing or be executing a target task. Similarly, the condition stetting table stores identification information for identifying the operation media, and prescribed distances (second prescribed distances) set for respective types of operation media in advance. A second prescribed distance is a distance between the HMD 20 and an operation medium where the user can be determined to have an intention of executing or be executing a target task.

In the present exemplary embodiment, the control unit 33 identifies an input device by using a shape recognition technique, and identifies an operation medium by using a color recognition technique. As illustrated in FIG. 4, identification information about an input device is, for example, a template image indicating a pattern shape of the input device. Identification information about an operation medium is, for example, color information (R, G, and B) indicating color of the operation medium. The methods for identifying an input device and an operation medium are not limited to those using a shape recognition technique or a color recognition technique.

The input device determination unit 33b (hereinafter, referred to as "determination unit 33b") identifies an input device lying in the field of view range of the user based on the identification information about the input devices read by the condition setting unit 33a. In the present exemplary embodiment, the determination unit 33b identifies an input device lying in the images captured by the imaging units 21L and 21R as one lying in the field of view range of the user. If the input device is, for example, a keyboard, the determination unit 33b determines whether there is an image (pixel block) similar to a keyboard template image read by the condition setting unit 33a in the captured images. The determination unit 33b can determine whether there is such a similar image, depending on whether a correlation value between a luminance component of a predetermined horizontal line in the template image and a luminance component of a horizontal line of a predetermined area of interest in the captured images is greater than a predetermined threshold.

The input device distance measurement unit 33c (hereinafter, referred to as "distance measurement unit 33c") measures (detects) a distance between the input device and the HMD 20. For example, the distance measurement unit 33c measures the distance from the HMD 20 to the input device by measuring the distance to the input device with the coordinates of a center point of the display unit 22L for the left eye as the origin. In the present exemplary embodiment, the HMD 20 includes a stereoscopic camera. The distance measurement unit 33c can thus measure the distance from the HMD 20 to the input device by using the principle of triangulation.

The operation medium determination unit 33d (hereinafter, referred to as "determination unit 33d") identifies an operation medium lying in the field of view range of the user based on the identification information about the operation media read by the condition setting unit 33a. In the present exemplary embodiment, the determination unit 33d identifies an operation medium lying in the images captured by the imaging units 21L and 21R as one lying in the field of view range of the user. If the operation medium is, for example, the user's hand, the determination unit 33d initially extracts a skin-color region from the captured images based on color information that is the identification information about the operation medium read by the condition setting unit 33a. More specifically, the determination unit 33d determines pixel-by-pixel whether the R, G, and B values of each pixel of the captured images are within the ranges of R, G, and B values described in the identification information about the operation medium illustrated in FIG. 4, and determines a skin-color region. The determination unit 33d then determines whether the amount of pixels constituting the determined skin-color region is within a predetermined range. In such a manner, the determination unit 33d can identify the operation medium lying in the field of view range of the user.

The operation medium distance measurement unit 33e (hereinafter, referred to as "distance measurement unit 33e") measures (detects) a distance between the operation medium and the HMD 20. For example, the distance measurement unit 33e measures the distance from the HMD 20 to the operation medium by measuring the distance to the operation medium with the coordinates of the center point of the display unit 22L for the left eye as the origin. For example, if the operation medium is a hand, the distance measurement unit 33e initially detects skin-color regions described above from the stereoscopic images. The distance measurement unit 33e detects the centers of gravity of the respective skin-color regions. From among the determined centers of gravity, the distance measurement unit 33e then determines the ones that have a vertical axis value within predetermined thresholds in the left and right images to be those of hand regions. Based on the positions of the centers of gravity of the hand regions in the left and right images, the distance calculation unit 33e can measure the distance from the HMD 20 to the operation medium by using the principle of triangulation.

The task determination unit 33f determines a target task by determining whether the distance between the HMD 20 and the input device and the distance between the HMD 20 and the operation medium are within the respective ranges of prescribed distances. The task determination unit 33f outputs an instruction to execute the target task to the task execution unit 34 illustrated in FIG. 1. For example, if the input device determination unit 33b identifies a keyboard as the input device and the determination unit 33d identifies a hand as the operation medium, the task determination unit 33f refers to the prescribed distances [cm] that are the determination parameters of the text input task illustrated in FIG. 4. The task determination unit 33f determines whether the distance between the HMD 20 and the input device and the distance between the HMD 20 and the operation medium are within the respective ranges of prescribed distances of 10 cm to 50 cm. If the distance between the HMD 20 and the input device and the distance between the HMD 20 and the input device are determined to be within the respective ranges of prescribed distances, the task determination unit 33f determines that the task that the user is attempting to start (next task to be executed) is the text input task. In such a manner, the task determination unit 33f determines the task to be executed based on the combination of the input device determined to be in the range of prescribed distances and the operation medium determined to be in the range of prescribed distances.

The functions of the components of the information processing apparatus 30 illustrated in FIG. 1 and the functions of the components of the control unit 33 illustrated in FIG. 3 can be implemented by the CPU 301 illustrated in FIG. 2 executing a program or programs stored in the RAM 302, the ROM 303, the storage unit 304, or the storage medium 305.

The task determination processing executed by the control unit 33 will be specifically described below.

Figure 5:
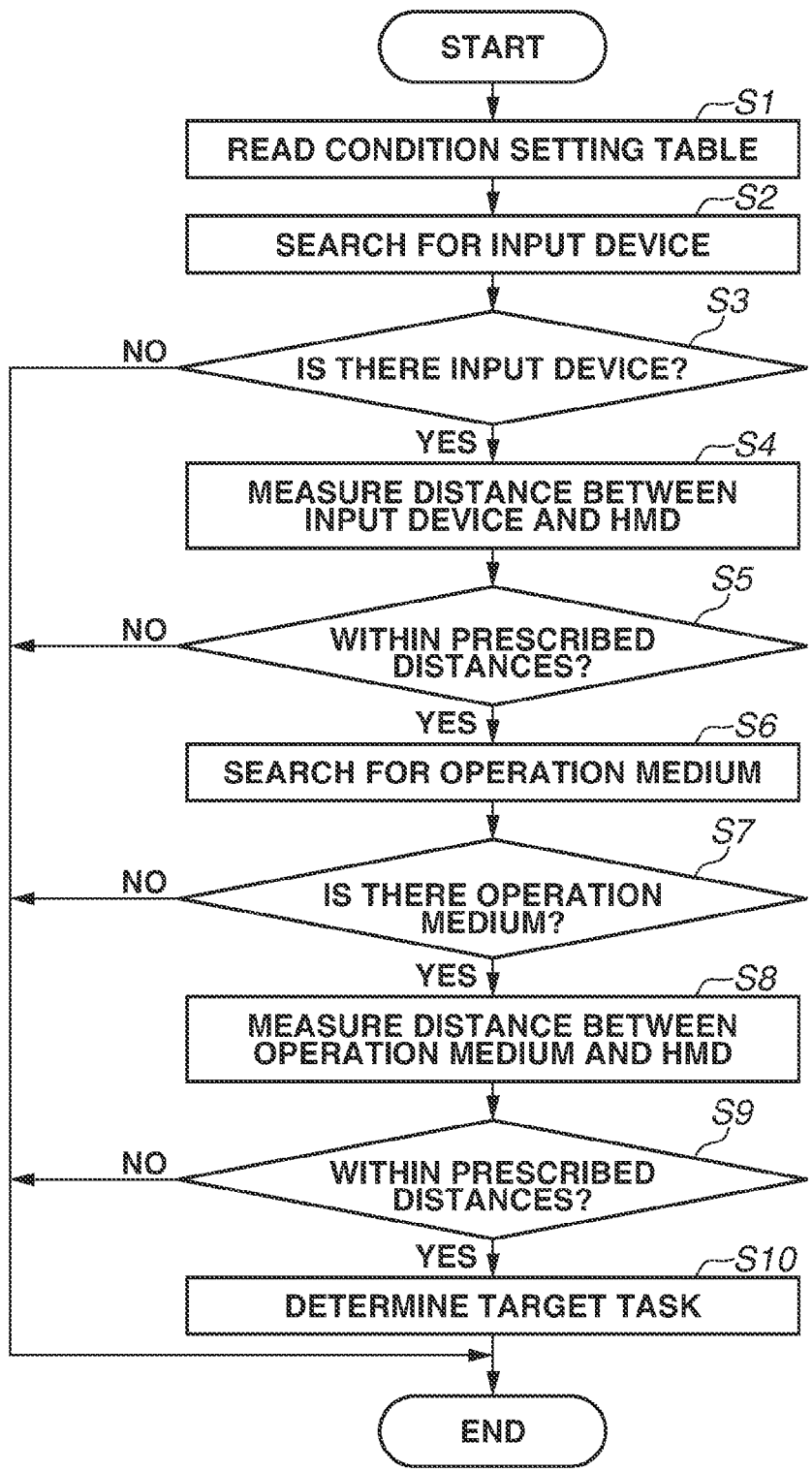
FIG. 5 is a flowchart illustrating an operation of the information processing apparatus.

FIG. 5 is a flowchart illustrating a task determination processing procedure executed by the control unit 33. The processing illustrated in FIG. 5 can be implemented by the CPU 301 of the information processing apparatus 30 reading and executing a predetermined program. Part or all of the processing illustrated in FIG. 5 can be implemented by dedicated hardware.

Figure 6:
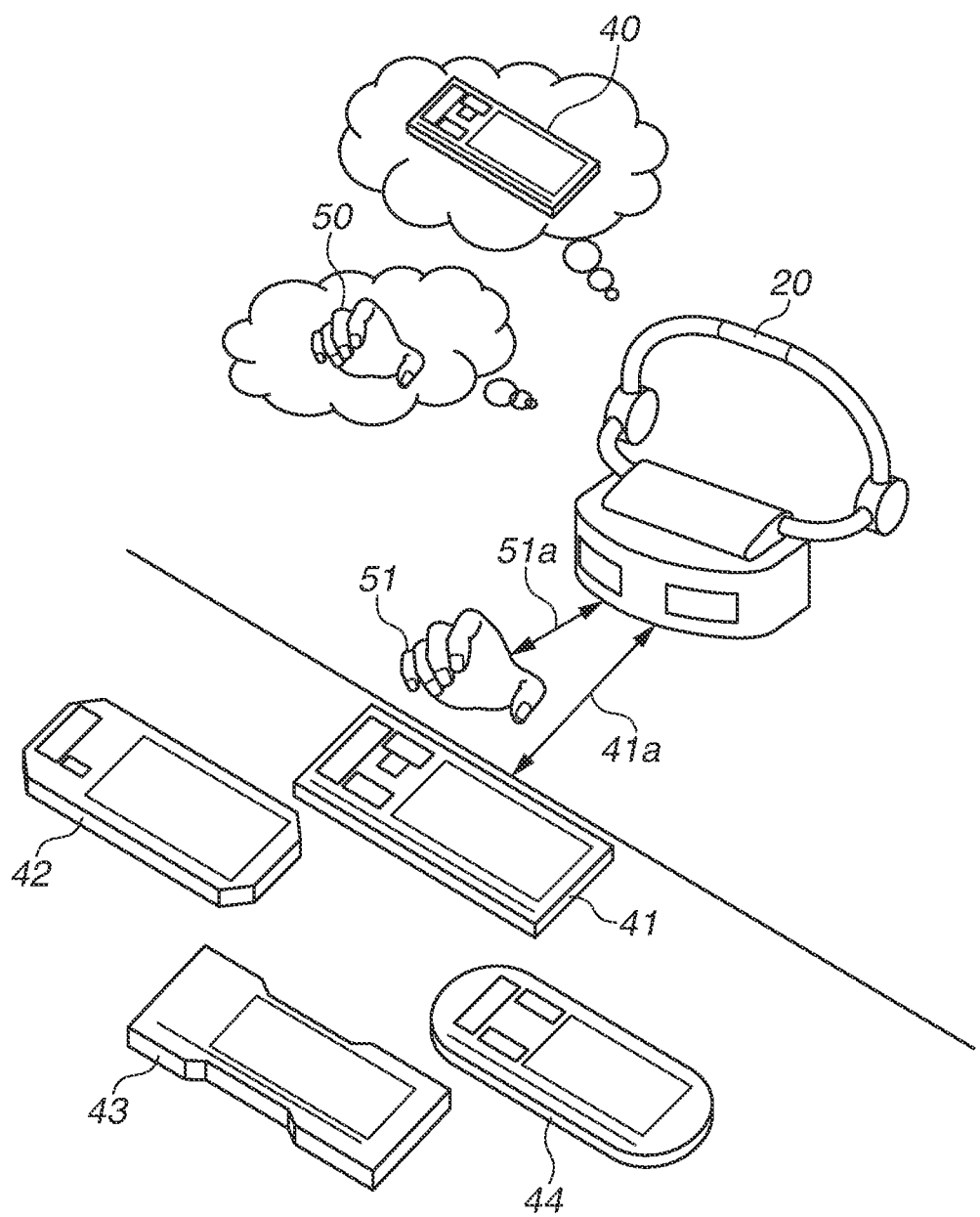
FIG. 6 is a diagram illustrating an operation of the information processing apparatus.

In step S1, the control unit 33 reads the condition setting table registered in advance, and obtains the identification information about the input devices, the identification information about the operation media, and the determination parameters of distance (prescribed distances). Then, the processing proceeds to step S2. In step S2, the control unit 33 searches the images captured by the imaging units 21L and 21R of the HMD 20 for an input device by using the identification information about the input devices obtained in step S1. As illustrated in FIG. 6, if there is a plurality of objects 41 to 44 in the direction of the user's eyes from the HMD 20, the captured images include images of the objects 41 to 44. In such a case, the control unit 33 determines whether there is an object that matches identification information 40 about an input device obtained in step S1 from among the objects 41 to 44.

In step S3, if an input device is found in step S2 (YES in step S3), the control unit 33 determines that an input device lying in the field of view range of the user is successfully identified. The processing then proceeds to step S4. If it is determined that there is no input device in the captured images (NO in step S3), the control unit 33 outputs an instruction to end a running application to the task execution unit 34. Then, the processing illustrated in FIG. 5 ends. In such a manner, if the direction of the user's eyes moves and a state in which there is an input device in the field of view range of the user is switched to a state in which there is no input device, the control unit 33 can automatically determine that the operation is ended, and hide the application.

In step S4, the control unit 33 measures the distance between the input device identified in step S2 and the HMD 20. For example, if the object 41, which is a keyboard illustrated in FIG. 6, is identified as the input device, the control unit 33 measures a distance 41a between the input device 41 and the HMD 20.

In step S5, the control unit 33 determines whether the distance 41a between the input device 41 and the HMD 20 is within the range of prescribed distances, i.e., whether the input device 41 is located within the prescribed distances with the coordinates of the center point of the display unit 22L for the left eye of the HMD as the origin. The prescribed distances are determination parameters obtained by referring to the condition setting table in step S1. If the control unit 33 determines that the distance 41a is within the prescribed distances (YES in step S5), the processing proceeds to step S6. If the control unit 33 determines that the distance 41a is outside the prescribed distances (NO in step S5), the control unit 33 determines that the input device 41 is not located within the range where the user can operate the input device 41 and that the user does not have the intention of operating the input device 41, and ends the processing illustrated in FIG. 5. Here, the control unit 33 outputs an instruction to end the running application to the task execution unit 34 and then ends the processing. In such a manner, the control unit 33 can appropriately determine that the user has finished using the input device 41, and automatically hide the application.

In step S6, as with the search for an input device in step S2, the control unit 33 searches the images captured by the imaging units 21L and 21R of the HMD 20 for an operation medium by using the identification information about the operation media obtained in step S1. In step S7, if an operation medium is found in step S6 (YES in step S7), the control unit 33 determines that an operation medium lying in the field of view range of the user is successfully identified. The processing then proceeds to step S8. If it is determined that there is no operation medium in the captured images (NO in step S7), the control unit 33 outputs an instruction to end the running application to the task execution unit 34. Then, the processing illustrated in FIG. 5 ends. In step S8, the control unit 33 measures the distance between the operation medium identified in step S6 and the HMD 20. For example, as illustrated in FIG. 6, if the user's hand 51 that matches identification information 50 about an operation medium is identified as the operation medium, the control unit 33 measures a distance 51a between the operation medium 51 and the HMD 20.

In step S9, the control unit 33 determines whether the distance 51a between the operation medium 51 and the HMD 20 is within the prescribed distances, or equivalently, whether the operation medium 51 is located within the prescribed distances with the coordinates of the center point of the display unit 22L for the left eye of the HMD 20 as the origin. The prescribed distances are determination parameters obtained by referring to the condition setting table in step S1. If the control unit 33 determines that the distance 51a is within the prescribed distances (YES in step S9), the processing proceeds to step S10. If the control unit 33 determines that the distance 51a is outside the prescribed distances (NO in step S9), the control unit 33 determines that the operation medium 51 is not located within the range where the user can operate the input device 41 and that the user does not have the intention of operating the input device 41 via the operation medium 51, and ends the processing illustrated in FIG. 5. Here, the control unit 33 outputs an instruction to end the running application to the task execution unit 34 and then ends the processing. In such a manner, the control unit 33 can appropriately determine that the user has finished using the input device 41, and automatically hide the application.

In step S10, the control unit 33 determines a target task based on the processing result of steps S2 to S9. More specifically, the control unit 33 determines a target task by referring to the condition setting table based on the combination of the input device located within the prescribed distances from the HMD 20 and the operation medium located within the prescribed distances from the HMD 20. The control unit 33 then outputs an instruction to execute the determined target task to the task execution unit 34 illustrated in FIG. 1. An application for executing the target task is thereby activated. For example, if the input device is a keyboard and the operation medium is the user's hand, the control unit 33 determines that the target task is a text input task. In such a case, the task execution unit 34 activates a character editor application as the application for executing the text input task.

Figure 7:
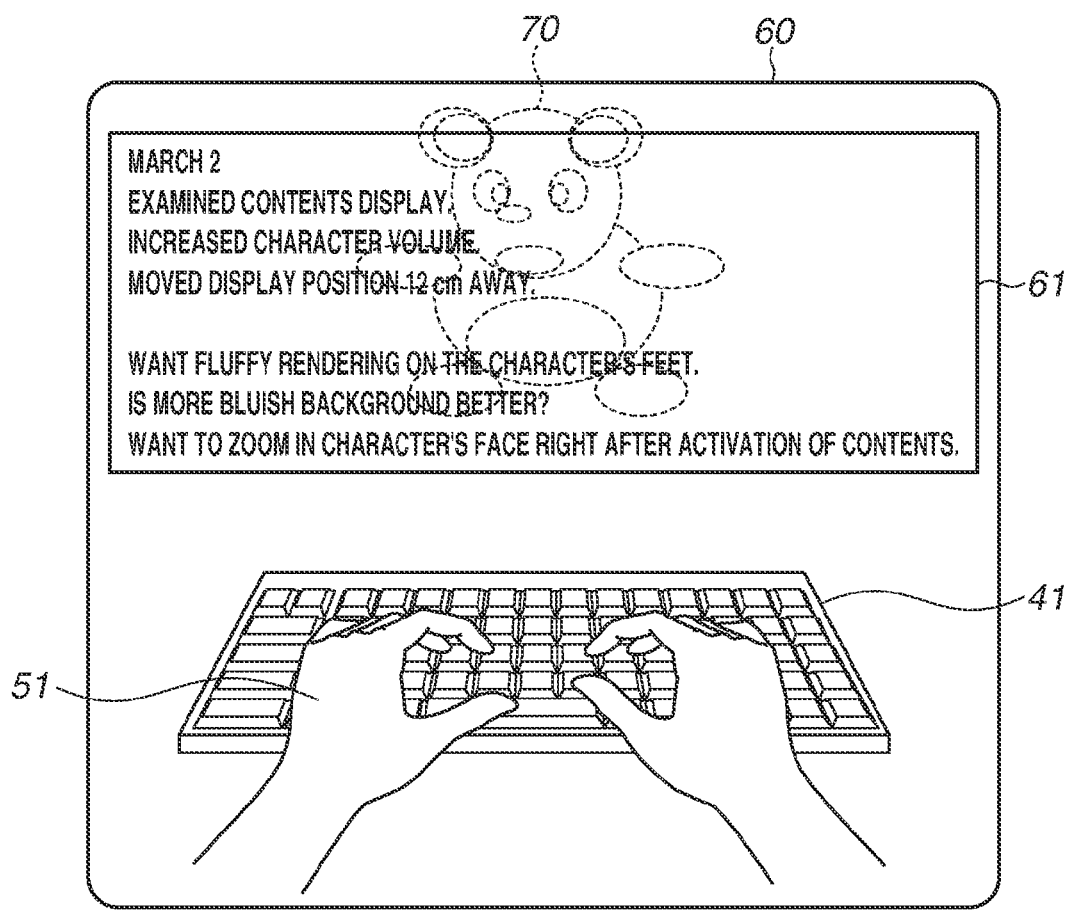
FIG. 7 is a diagram illustrating a state in which a character input application is activated.

FIG. 7 illustrates an example of an HMD screen 60 when the text input task is executed. The HMD screen 60 displayed by the display units 22L and 22R of the HMD 20 can display real objects, such as the input device 41 and the user's hand 51, and virtual contents 70. If the character editor application is activated, as illustrated in FIG. 7, the HMD screen 60 can be switched to a state capable of inputting characters by displaying a text input field 61 in a superimposed manner. Here, the text input field 61 is displayed not to overlap with the input device (keyboard) 41 so that the user can observe the key arrangement on the keyboard 41 while inputting characters.

The method for displaying the text input field 61 is not limited to the one illustrated in FIG. 7. If the text input field 61 is displayed to overlap with the keyboard 41, the text input field 61 can be displayed in a transparent manner so that the keyboard 41 in the background can be observed. The information displayed when the character editor application is activated is not limited to the text input field 61.

If the input device is a controller and the operation medium is the user's hand, the control unit 33 determines that the target task is a CG adjustment task. In such a case, the task execution unit 34 activates a contents moving application as an application for executing the CG adjustment task.

Figure 8:
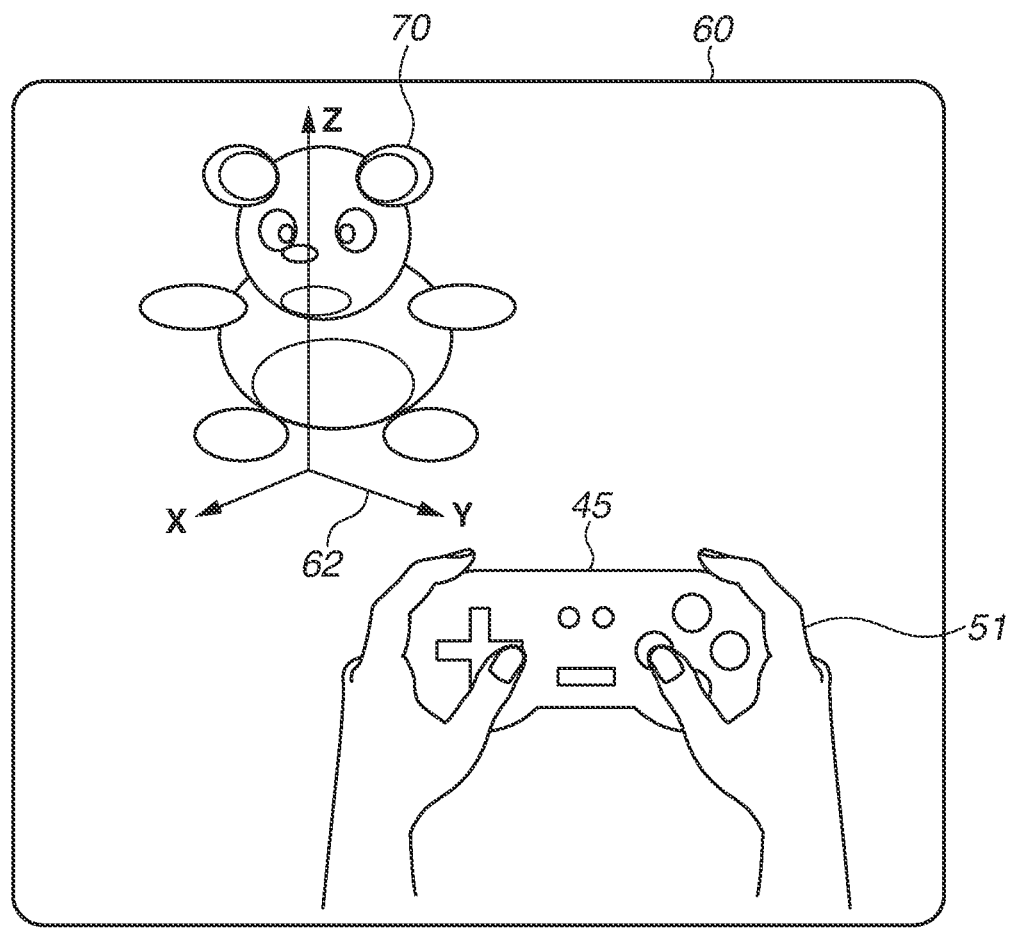
FIG. 8 is a diagram illustrating a state in which a computer graphics (CG) adjustment application is activated.

FIG. 8 illustrates an example of the HMD screen 60 when the CG adjustment task is executed. The HMD screen 60 displayed by the display units 22L and 22R of the HMD 20 displays real objects, such as a controller or input device 45 and the user's hand 51, and the virtual contents 70. If the contents moving application is activated, as illustrated in FIG. 8, the HMD screen 60 can be switched to a state capable of moving contents by displaying coordinate axes 62 in a superimposed manner. The method for displaying the coordinate axes 62 is not limited to the one illustrated in FIG. 8. The information displayed when the contents moving application is activated is not limited to the coordinate axes 62.

As described above, in the present exemplary embodiment, the information processing apparatus 30 determines a task by identifying an input device and an operation medium lying in the field of view range of the user and detecting (measuring) the distances from a point of view position of the user (position of the HMD 20) to the respective identified input device and operation medium. The formation processing apparatus 30 can thus determine a task that the user is attempting to start without a need for the dismounting and re-mounting of the HMD 20, and automatically switch to an application for executing the determined task. The user can thus execute the desired task without troublesome operations for switching applications.

If the user performs an operation for switching target applications to switch tasks, the user needs to operate an input device while viewing an operation menu or icons on screen. However, if the user wears an HMD, visual information to the user changes and the operation for switching target applications can be difficult with the HMD mounted.

For example, with a video see-through type HMD (combined display of a real image and a virtual CG image), the resolution of the real space can drop due to camera resolution. Visual information can lag behind body motions due to a delay of video display. An input device such as a keyboard may need time to operate. More specifically, an optical see-through type HMD (displays only CG in a real space)

often includes a luminance adjustment film in the see-through region to make the actually-captured video image dimmer so that contents images are given emphasis over the actually-captured background. With the optical see-through type HMD, the luminance adjustment film makes the real space look dim, and a low-contrast input device such as a keyboard may need time to accurately operate. With a VR HMD (full-screen CG display) that blocks the video image of the real space, it is difficult to operate a mouse and a keyboard that are placed in the real space.

From the foregoing reasons, the user wearing an HMD has, on their own, needed to dismount and re-mount the HMD in switching target applications. More specifically, if the user switches tasks, the user dismounts the HMD, visually observes the input device, and then operates the input device with the operation medium to switch to a needed application. After switching the applications, the user re-mounts the HMD again and executes a predetermined task.

MR systems and VR systems are systems that can provide the user with a sense of immersion as if virtual contents actually exist in a real space. The dismounting and re-mounting of the HMD for application switching impairs the foregoing sense of immersion. Taking time to dismount and re-mount the HMD can also lead to poor concentration on the task.

In some approaches, the user wearing an HMD can switch applications without using an actual input device. One example is using a virtual input system. A vertical input system refers to a system using a gesture recognition technique such as a virtual keyboard and a virtual menu. Specifically, motion of an operation medium, such as the user's hand, is kept track of by using a video camera or a sensor. If the user makes a corresponding motion, an application is switched to a target one. However, such a system is not able to provide the feel of an operation medium coming into contact with an input device, and can invite erroneous operations.

Another example of the method for switching applications is a method using an object recognition input system. The object recognition input system is a system using a shape recognition technique such as pattern matching. More specifically, if a prescribed object or marker is recognized to be captured in an image by a shape recognition technique, an application is switched to a target one. However, such a system can cause misrecognition if the prescribed object or marker is accidentally captured in the image.

In contrast, according to the present exemplary embodiment, as described above, applications can be switched with the user wearing the HMD 20. This eliminates the need for the time-consuming dismounting and re-mounting of the HMD 20, and can prevent impairment of the sense of immersion and poor concentration on the task due to dismounting and re-mounting. The information processing apparatus 30 determines the presence or absence of an input device and an operation medium by using a shape recognition technique and a color recognition technique in a real space, based on whether the input device and the operation medium match the identification information, as well as determines the distance between the HMD 20 and the input device and the distance between the HMD 20 and the operation medium. The information processing apparatus 30 can thus appropriately determine a task that the user is attempting to start, and automatically switch to an appropriate application. Since the input device as well as the operation medium (user's hand) for operating the input device is recognized, the application that the user is attempting to start can be determined with high accuracy.

The information processing apparatus 30 further detects the position and orientation of the user's head, and detects the distance between the HMD 20 and the input device and the distance between the HMD 20 and the operation medium based on the detected position and orientation of the user's head. Since the measurement of the position and orientation of the user's head is included in the detection of the distance between the HMD 20 and the input device and the distance between the HMD 20 and the operation medium, the information processing apparatus 30 can accurately detect the distances and reduce misrecognition and erroneous operations.

The information processing apparatus 30 obtains the images in the direction of the user's eyes, captured from the point of view positions of the user, and recognizes an input device and an operation medium lying in the obtained images as an input device and an operation medium lying in the field of view range of the user. The use of the images in the direction of the user's eyes enables easy and appropriate identification of the input device and the operation medium lying in the field of view range of the user. In other words, the directions in which the input device and the operation medium are located with respect to a point of view position of the user (HMD) do not need to be separately determined from position information about the input device and the operation medium.

The HMD 20 serving as a head mounted display is a video see-through type HMD. The information processing apparatus 30 can thus obtain the images in the direction of the user's eyes from the cameras preinstalled on the HMD 20. The information processing apparatus 30 can obtain a plurality of images in the direction of the user's eyes, captured from a respective plurality of point of view positions corresponding to the left and right eyes of the user. The information processing apparatus 30 can thus easily detect the distance from the HMD 20 to the input device and the distance to the operation medium based on the obtained plurality of images by using the principle of triangulation.

The information processing apparatus 30 determines whether the distance from the HMD 20 to the input device and the distance from the HMD 20 to the operation medium are within the ranges of prescribed distances that are set in advance for respective types of input devices and operation media. The information processing apparatus 30 then determines a task based on the combination of the input device determined to be in the range of prescribed distances and the operation medium determined to be in the range of prescribed distances. The information processing apparatus 30 can thus appropriately determine a task that the user is attempting to switch to, and automatically switch to an appropriate application with the user wearing the HMD 20 and without a need for the user's operation for a switching instruction.

Next, a second exemplary embodiment of the present invention will be described.

In the foregoing first exemplary embodiment, a video see-through type HMD is described as the head mounted display. The present exemplary embodiment describes a case where an optical see-through type HMD is used as the head mounted display.

Figure 9:
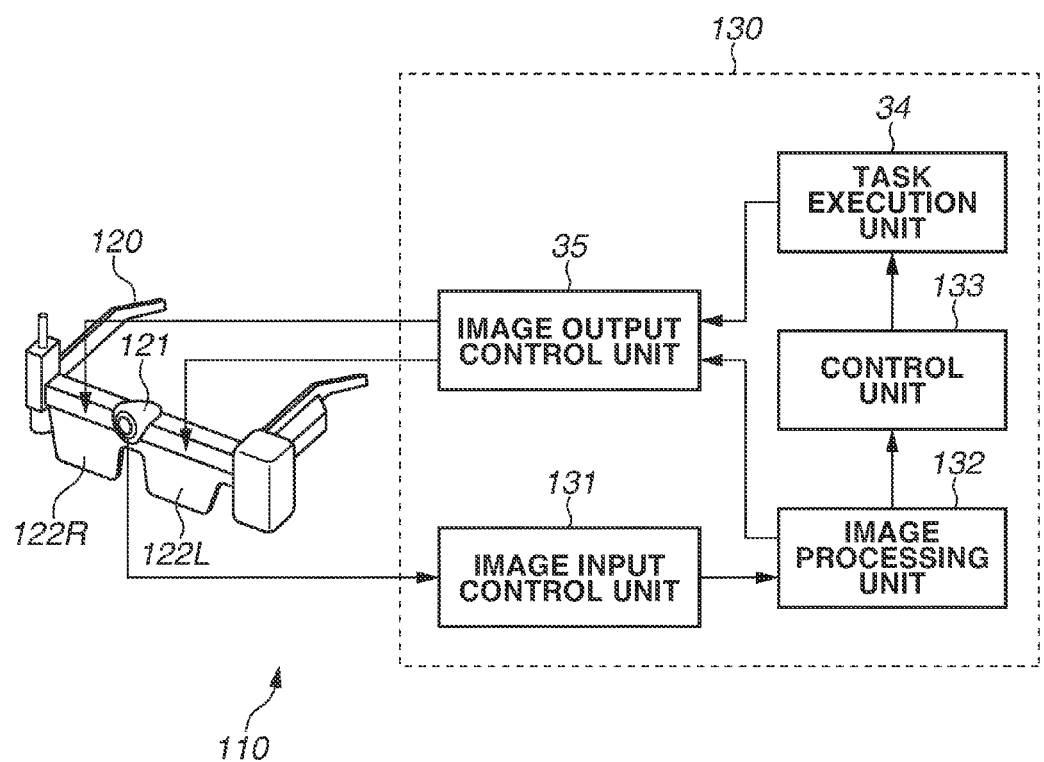
FIG. 9 is a diagram illustrating a configuration example of an MR system according to a second exemplary embodiment.

FIG. 9 is a diagram illustrating a configuration example of an MR system 110 including an information processing apparatus 130 according to the present exemplary embodiment. The hardware configuration of the information processing apparatus 130 is similar to that of the information processing apparatus 30 illustrated in FIG. 2. In FIG. 9, parts having a similar configuration to that of the first exemplary embodiment are designated by the same reference numerals as in FIG. 1. Parts having a different configuration will be described below.

The MR system 110 includes an optical see-through type HMD 120 and the information processing apparatus 130. The HMD 120 is a head mounted display that the user wears on the user's head. The HMD 120 includes an imaging unit 121 including a monocular video camera, and display units 122L and 122R. The imaging unit 121 captures a field of view image of the user wearing the HMD 120, and outputs the captured image to the information processing apparatus 130. Internal camera parameters of the monocular video camera, including a focal length and a lens distortion coefficient, are determined by a predetermined method and known in advance. The display units 122L and 122R include a half mirror, for example. The display units 122L and 122R mix light incident in a field of view direction of the user with display light of an image output from the information processing apparatus 130, and present the resultant to the user.

The information processing apparatus 130 inputs an image of a real space, output from the imaging unit 121 of the HMD 120, and generates a combined image of the input image and an image of a virtual space. The information processing apparatus 130 outputs the generated combined image to the display units 122L and 122R of the HMD 120. The information processing apparatus 130 executes task determination processing based on the image output from the imaging unit 121.

Specifically, an image input control unit 131 of the information processing apparatus 130 controls the image input unit 308 illustrated in FIG. 2 to obtain an image in the direction of the user's eyes, captured by the imaging unit 121 from the point of view position of the user. The information processing apparatus 130 performs lens distortion correction on the image obtained by the image input control unit 131, and handles the resulting image as having no distortion. An image processing unit 132 determines the position and orientation of the HMD 120 based on a standard coordinate system defined in the real space, and generates an image of a virtual space for presenting virtual contents according to the position and orientation. The position and orientation of the HMD 120 on the standard coordinate system can be measured based on the image captured by the imaging unit 121 and information about a position and orientation sensor (not illustrated). The position of the contents can be uniquely determined from the measurement result of the position and orientation of the HMD 120.

A control unit 133 inputs information (image information) about the image generated by the image processing unit 132, executes the task determination processing based on the input image information, and outputs the result of the task determination processing to the task execution unit 34. The configuration of the control unit 133 is similar to that of the control unit 33 of the first exemplary embodiment illustrated in FIG. 3. As compared to the processing of the components illustrated in FIG. 3, there is a difference in that the determination of the presence or absence of an input device and an operation medium and the detection of the distances thereof are performed by using the image captured by the imaging unit 121 illustrated in FIG. 9, instead of the images captured by the imaging units 21L and 21R illustrated in FIG. 1. In the measurement of the distances, the control unit 133 measures the distances with the coordinates of the center point of the display unit 122L for the left eye of the HMD 120 as the origin.

When measuring a distance from the HMD 120 to an object, the control unit 133 recognizes a shape and size of the object in the image captured by the imaging unit 121, and measures the distance based on the recognized shape and size. To measure a distance from the HMD 120 to an input device, the control unit 133 previously sets a distance from the HMD 120 to the input device when a template image, which is the identification information about the input device stored in the condition setting table illustrated in FIG. 4, is captured. The control unit 133 then determines a distance from the HMD 120 and the input image based on a scale ratio between the input device in the captured image and the corresponding template image.

To measure a distance from the HMD 120 to an operation medium, the control unit 133 previously sets an area (reference area) and the number of pixels (reference number of pixels) of a circumscribed rectangle of the operation medium on-screen, captured at a predetermined distance. The control unit 133 then determines the ratio between the area of the circumscribed rectangle of the operation medium in the captured image and the area set in advance, and the ratio between the number of pixels of the circumscribed rectangle of the operation medium in the captured image and the number of pixels set in advance. The control unit 133 calculates the distance from the HMD 120 to the operation medium based on an average value of the determined ratios of the areas and the numbers of pixels.

As described above, even if an optical see-through type HMD including a monocular camera is used, the information processing apparatus 130 can appropriately determine a task and automatically switch applications as in the first exemplary embodiment.

The information processing apparatus 130 detects the distance from the HMD 120 to the operation medium by comparing the area of a circumscribed figure (for example, circumscribed rectangle) that covers the region corresponding to the operation medium in the image captured by the imaging unit 121 of the HMD 120 with the predetermined reference area. Even if an optical see-through type HMD including a monocular camera is used, the information processing apparatus 130 can thus accurately detect the distance from the HMD 120 to the object. The circumscribed figure is not limited to a circumscribed rectangle. A circumscribed polygon or a circumscribed circle can be used.

In the present exemplary embodiment, the image of the virtual space is described to be displayed in the real space directly viewed by the user. However, the image of the virtual space can be superimposed on the image captured by the imaging unit 121, and the resultant can be displayed on the display units 122L and 122R. In the present exemplary embodiment, the HMD 120 is described to include a monocular camera. However, the HMD 120 can include a stereoscopic camera. In such a case, like the first exemplary embodiment, the distance from the HMD 120 to the input device and the distance from the HMD 120 to the operation medium can be measured by using the principle of triangulation.

Next, a third exemplary embodiment of the present invention will be described.

In the first and second exemplary embodiments, the task is described to be determined based on the image(s) in the direction of the user's eyes, captured by the camera(s) included in the HMD worn by the user. The present exemplary embodiment describes a case where a position and orientation sensor that measures the positions and orientation of the HMD, the input device, and the operation medium is used to determine a task.

Figure 10:
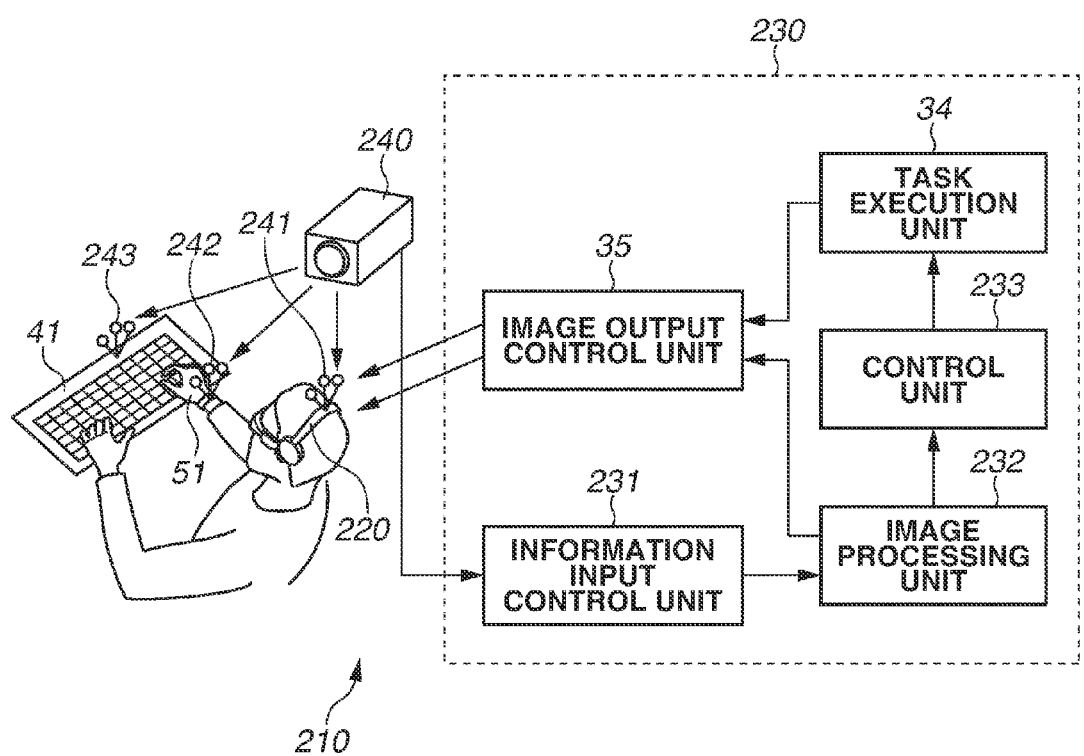
FIG. 10 is a diagram illustrating a configuration example of an MR system according to a third exemplary embodiment.

FIG. 10 is a diagram illustrating a configuration example of an MR system 210 including an information processing apparatus 230 according to the present exemplary embodiment. The hardware configuration of the information processing apparatus 230 is similar to that of the information processing apparatus 30 illustrated in FIG. 2. In FIG. 10, parts having a similar configuration to the configuration of the first exemplary embodiment are designated by the same reference numerals as in FIG. 1. Parts having a different configuration will be described below.

The MR system 210 includes an HMD 220 having no imaging function, the information processing apparatus 230, and an optical sensor 240 serving as a position and orientation sensor. The HMD 220 includes display units (not illustrated) that can display an image output by the information processing apparatus 230. The HMD 220 can be an optical see-through type HMD having no imaging function. The HMD 220 can be a video see-through type HMD or an optical see-through type HMD having an imaging function. While the present exemplary embodiment is described by using the MR system 210 as an example, the present exemplary embodiment is also applicable to a VR system for full-screen CG display, such as a layout simulation of virtual contents and a game using a virtual character. In other words, the HMD 220 can be a VR HMD.

The optical sensor 240 measures the position and orientation of a measurement object in a space by capturing a group of ball-shaped markers made of retroreflective material (hereinafter, referred to as a "rigid body") arranged on the measurement object with a plurality of cameras. In the present exemplary embodiment, an HMD rigid body 241 is arranged on the HMD 220, whereby the optical sensor 240 can detect the position and orientation of the HMD 220. An operation medium rigid body 242 is arranged on an operation medium (in FIG. 10, the user's hand) 51, whereby the optical sensor 240 can detect the position and orientation of the operation medium 51. An input device rigid body 243 is arranged on an input device (in FIG. 10, a keyboard) 41, whereby the optical sensor 240 can detect the position and orientation of the input device 41. The rigid bodies 241 to 243 have respective different layouts.

In such a manner, rigid bodies of different layouts are set for respective measurement objects so that the optical sensor 240 can identify the rigid bodies of different layouts as respective individual targets and measure the positions and orientation thereof. In the present exemplary embodiment, the optical sensor 240 outputs position and orientation information accompanied with identification numbers assigned to the rigid bodies of different layouts, such as target 1 and target 2, to the information processing apparatus 230.

An information input control unit 231 of the information processing apparatus 230 obtains the position and orientation information about the HMD 220, the input device 41, and the operation medium 51 in the three-dimensional space from the optical sensor 240, and outputs the position and orientation information to an image processing unit 232.

The image processing unit 232 stores the position and orientation information about the HMD 220, the input device 41, and the operation medium 51, input from the information input control unit 231. The image processing unit 232, based on the stored position and orientation information, measures the direction of the input device 41 with respect to the HMD 220 and the direction of the operation medium 51 with respect to the HMD 220. The information processing apparatus 232, based on the position and orientation information described above and information indicating the directions of the input device 41 and the operation medium 51, then generates an image of a CG model of the input device 41, an image of a CG model of the operation medium 51, an image of virtual contents, and combines the images. The image processing unit 232 determines the CG models to be generated based on the identification numbers of the input position and orientation information. For example, if an obtained identification number is one indicating a keyboard (target 1), the image processing unit 232 determines that the input device 41 is a keyboard, and generates a CG model of the keyboard. If the obtained identification number is one indicating a controller (target 2), the image processing unit 232 determines that the input device 41 is a controller, and generates a CG model of the controller. If the identification number is one indicating the user's hand (target 7), the image processing unit 232 determines that the operation medium 51 is the user's hand, and generates a CG model of the hand. Details of the image processing unit 232 will be described below.

The image processing unit 232 then outputs the generated images to the image output control unit 35 for user presentation. The image output control unit 35 causes the display units of the HMD 220 to display the input images, whereby the user can observe the images of the CG models of the input device 41 and the operation medium 51, and the image of the contents. The user can thus find out the positions of the respective objects in the space.

The image processing unit 232 further outputs the stored position and orientation information about each measurement object and the information indicating the direction of each of the input device 41 and the operation medium 51 with respect to the HMD 220 to a control unit 233. The control unit 233 performs task determination processing based on the information input from the image processing unit 232. The control unit 233 refers to a condition setting table illustrated in FIG. 11, and determines a task by comparing the distance from the HMD 220 to the input device 41 and the distance from the HMD 220 to the operation medium 51 with the respective prescribed distances set in the condition setting table. Details of the control unit 233 will be described below.

(Configuration of Image Processing Unit 232)

Figure 12:
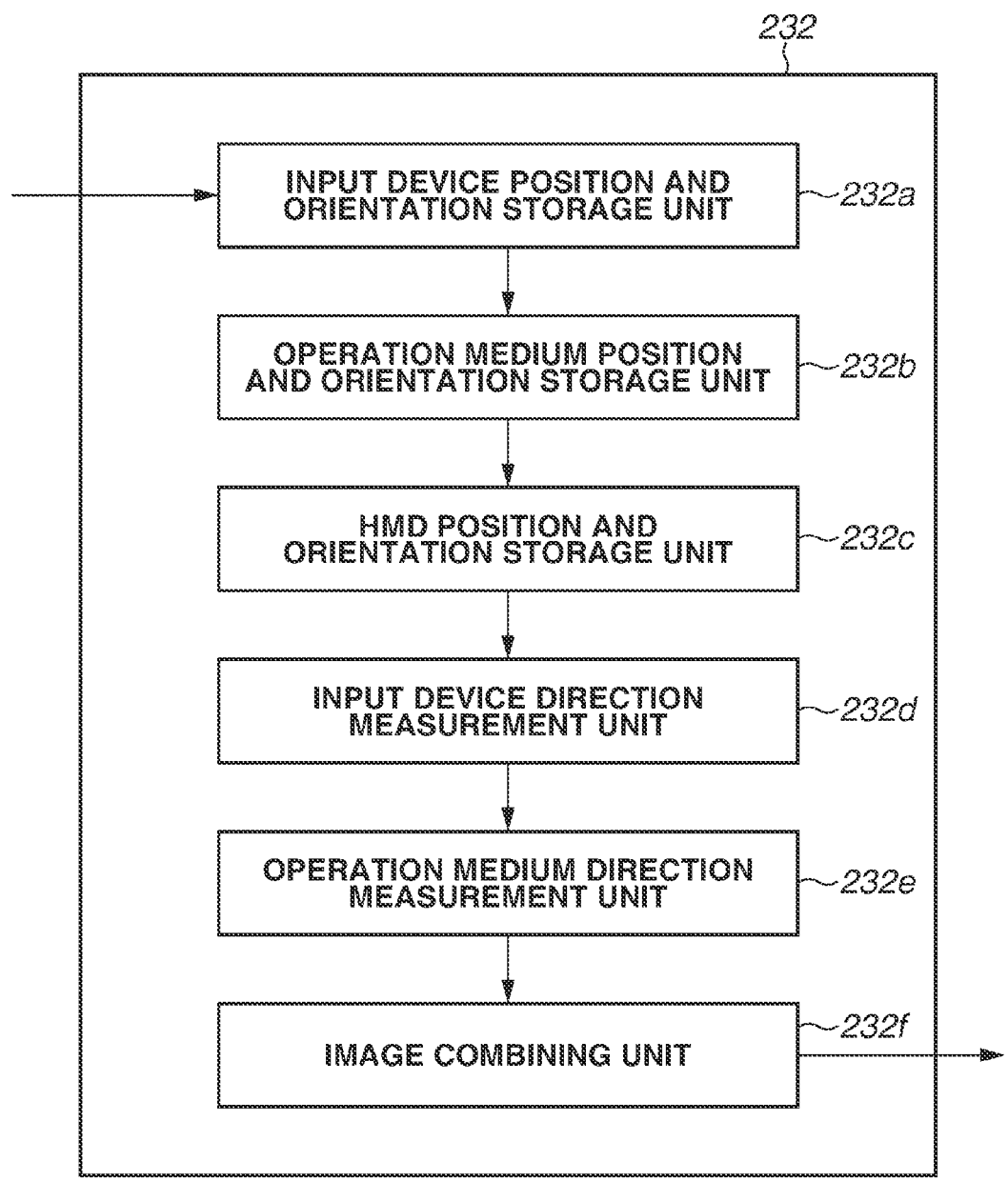
FIG. 12 is a functional block diagram illustrating an image processing unit of an information processing apparatus.

A configuration of the image processing unit 232 will be described below. FIG. 12 is a functional block diagram illustrating the image processing unit 232. The image processing unit 232 includes an input device position and orientation storage unit 232a, an operation medium position and orientation storage unit 232b, an HMD position and orientation storage unit 232c, an input device direction measurement unit 232d, an operation medium direction measurement unit 232e, and an image combining unit 232f.

The input device position and orientation storage unit 232a stores the position and orientation information about the input device 41, output from the information input control unit 231. The operation medium position and orientation storage unit 232b stores the position and orientation information about the operation medium 51, output from the information input control unit 231. The HMD position and orientation storage unit 232c stores the position and orientation information about the HMD 220, output from the information input control unit 231. If the input device position and orientation storage unit 232a obtains new position and orientation information about the input device 41 measured by the optical sensor 240, the input device position and information storage unit 232a overwrites the stored position and orientation information with the new position and orientation information obtained. The same applies to the operation medium position and orientation storage unit 232b and the HMD position and orientation storage unit 232c.

The input device direction measurement unit 232d measures the direction of the input device 41 with respect to the HMD 220. The input device direction measurement unit 232d initially measures the direction (direction of eyes) and range (field of view range) in which the user performs observation via the HMD 220, based on the position and orientation information about the HMD 220. The input device direction measurement unit 232d then measures the direction of the input device 41 with respect to the HMD 220 and measures the distance from the HMD 220 to the input device 41 based on the position and orientation of the HMD 220 and the position and orientation of the input device 41. The operation medium direction measurement unit 232e measures the direction of the operation medium 51 with respect to the HMD 220. The operation medium direction measurement unit 232e measures the direction of the operation medium 51 with respect to the HMD 220 and the distance from the HMD 220 to the operation medium 51 based on the position and orientation of the HMD 220 and the position and orientation of the operation medium 51.

The image combining unit 232f generates the image of the CG model of the input device 41, the image of the CG model of the operation medium 51, and the image of the virtual contents, and combines the images based on the information measured by the input device direction measurement unit 232d and the operation medium direction measurement unit 232e.

(Configuration of Control Unit 233)

Next, a configuration of the control unit 233 will be described. A functional block diagram of the control unit 233 is similar to that of the control unit 33 illustrated in FIG. 3. The following description will thus be given with reference to FIG. 3.

A processing unit corresponding to the condition setting unit 33a reads the condition setting table illustrated in FIG. 11 as the condition setting table for use in determining a task. In the present exemplary embodiment, the input device 41 and the operation medium 51 are identified by using the position and orientation information output from the optical sensor 240. As illustrated in FIG. 11, the identification numbers of the measurement objects output from the optical sensor 240 are therefore stored as the identification information about the input device 41 and the operation medium 51.

A processing unit corresponding to the determination unit 33b determines whether there is an input device in the field of view range of the HMD 220 based on the field of view range of the HMD 220, measured by the image processing unit 232, and the direction of the input device with respect to the HMD 220. A processing unit corresponding to the distance measurement unit 33c obtains the direction from the HMD 220 to the input device that is determined to be in the field of view range of the user, the distance being measured by the image processing unit 232.

A processing unit corresponding to the determination unit 33d determines whether there is an operation medium in the field of view range of the HMD 220 based on the field of view range of the HMD 220, measured by the image processing unit 232, and the direction of the operation medium with respect to the HMD 220. A processing unit corresponding to the distance measurement unit 33e obtains the distance from the HMD 220 to the operation medium that is determined to be in the field of view range of the user, the distance being measured by the image processing unit 232.

A processing unit corresponding to the task determination unit 33f determines a target task by determining whether the distance between the HMD 220 and the input device and the distance between the HMD 220 and the operation medium are within the respective ranges of prescribed distances. The processing unit outputs an instruction to execute the target task to the task execution unit 34. The prescribed distances are set in the condition setting table illustrated in FIG. 11 in advance.

The functions of the components of the information processing apparatus 230 illustrated in FIG. 10 and the functions of the control unit 233 corresponding to the respective components illustrated in FIG. 3 can be implemented by the CPU 301 illustrated in FIG. 2 executing a predetermined program or programs.

As described above, in the present exemplary embodiment, the information processing apparatus 230 detects the position and orientation of the input device and the position and orientation of the operation medium by using the position and orientation sensor. The information processing apparatus 230 also detects the position and orientation of the user's head, or equivalently, the position and orientation of the HMD 220 by using the position and orientation sensor. The information processing apparatus 230 then identifies the input device lying in the field of view range of the user based on the position and orientation of the user's head and the position and orientation of the input device. Similarly, the information processing apparatus 230 identifies the operation medium lying in the field of view range of the user based on the position and orientation of the user's head and the position and orientation of the operation medium. Even if the HMD 220 including no camera is used, the information processing apparatus 230 can thus appropriately determine a task and automatically switch applications as in the first and second exemplary embodiments.

In the present exemplary embodiment, the optical sensor 240 is described to be used as the position and orientation sensor for measuring the positions and orientation of a plurality of objects serving as measurement objects. However, the position and orientation sensor is not limited to the optical sensor 240. Magnetic sensors and mechanical sensors can be used. If magnetic sensors are used, an HMD magnet is arranged on the HMD 220, an input device magnet is arranged on the input device, and an operation medium magnet is arranged on the operation medium. Magnetic sensors paired with the magnets can then be used to detect the positions and orientation of the HMD 220, the input device, and the operation medium.

In the exemplary embodiments, a camera can be used as the position and orientation sensor. More specifically, the camera is used to capture an image of the user, the input device, and the operation medium. The position and orientation of the user's head, the position and orientation of the input device, and the position and orientation of the operation medium can be detected based on the captured image. Even in such a case, a task to which the user is attempting to switch can be appropriately determined and an application can be automatically switched to an appropriate one with the user wearing the HMD 220 and without a need for the user's operation for a switching instruction.

In the above-described exemplary embodiments, the input device is described to be a keyboard for inputting characters or a gaming controller for moving or rotating CG. However, the input device is not limited thereto. The input device can be a three-dimensional pointing device with a button (hereinafter, referred to as a "stylus") including a built-in sensor capable of measuring a position and orientation.

If the input device is a stylus, the operation medium is the user's hand. In such a case, examples of a task that the user can execute can include one for controlling surface shape control points of a CG model displayed in a space. Specifically, the user can modify a curved surface shape while observing a three-dimensional CAD model of a vehicle in a three-dimensional space through the HMD. In such a situation, if the user holds the stylus, the information processing apparatus can activate a curved surface editing application for executing the task of editing a curved surface shape, enable a curved surface editing function, and display the curved surface control points of the three-dimensional shape.

When the user moves the stylus to a point of view position, the information processing apparatus can thus switch to a mode in which a curved surface shape can be edited, without the user operating a menu to manipulate curved surface control points. The user can thus efficiently perform the desired task. The information processing apparatus can be configured to, if the user removes the user's hand from the stylus in the same environment, hide the curved surface control points and switch to a display in which the external appearance of the three-dimensional shape can be checked. In such a manner, the automatic task determination can be appropriately performed even with input devices other than a keyboard or a controller. The input device can be a touch panel or a mouse.

In the above-described exemplary embodiments, the operation medium is described to be the user's hand. However, the operation medium is not limited to the user's hand. The operation medium can be a gloved hand. The glove can be a single-color made of cloth or resin with suppressed light reflection. If a camera or cameras built in the HMD is/are used to recognize the operation medium, an image of such a glove worn on the user's hand can be captured to improve the recognition rate of the hand serving as the operation medium.

The operation medium can be an arm of a remote operation robot that operates remotely according to human instructions. In such a case, the positions and orientation of an input device and the robot arm arranged in a remote place in a coordinate system with respect to the remote place can be transformed into coordinates in a reference coordinate system of the space where the user wears the HMD. The information processing apparatus can perform the automatic task determination processing in a similar manner to in the foregoing exemplary embodiments by determining the presence or absence of the input device and the robot arm and measuring the respective distances from the HMD based on the positions and orientation of the input device and the robot arm after the coordinate transformation. The operation medium can be a stylus. In such a case, the input device can be a touch panel.

In the above-described exemplary embodiments, the combinations of input devices and operation media are described to have a one-to-one relationship with the target tasks. However, one combination can be associated with a plurality of target tasks. In other words, one input device can be configured to be able to execute a plurality of tasks. In such a case, a task corresponding to the one executed immediately before can be determined to be executed among the plurality of tasks associated with the combination. Specifically, suppose that a first input device for executing a first task is detected to be quickly switched to a second input device. The second input device is associated with a second task and a third task that is related to the first task. In such a case, the first task can be switched to the third task.

In the first exemplary embodiment, if the user performs CG adjustment, which is a first task, by using the controller, which is a first input device, and then switches to the keyboard, which is a second input device, the information processing apparatus 30 switches to a state where text input, which is a second task, can be performed. However, the user may want to execute, for example, a comment insertion task for inserting a comment to the CG model after the end of the CG adjustment task. In such a case, the user puts down the controller and switches quickly to the keyboard.

If the controller, which is the first input device, is quickly switched to the keyboard, which is the second input device, the information processing apparatus can switch to a third task (comment insertion) instead of the second task (text input). Specifically, the information processing apparatus can perform the task determination processing by referring to a condition setting table illustrated in FIG. 13. The condition setting table illustrated in FIG. 13 includes information about prescribed time that defines switching time between different types of input devices.

According to the task determination processing with reference to the condition setting table illustrated in FIG. 13, if the user puts down the controller, an input device, and switches to the keyboard within the prescribed time (for example, within three seconds), the information processing apparatus determines that the user desires to insert a comment into the CG model. The information processing apparatus then displays a comment input field on an editing position on the three-dimensional model. If the user puts down the controller, an input device, and switches to the keyboard after a lapse of the prescribed time (for example, three seconds), the information processing apparatus determines that the user does not desire to insert a comment into the CG model. The information processing apparatus then displays a memo generation field on a predetermined position.

In such a manner, the information processing apparatus measures the time between when an input device determined to be in the range of prescribed distances is determined to be outside the range of prescribed distances and when a new input device of different type is determined to be in the range of prescribed distances. The information processing apparatus then determines whether the measured time is within the range of prescribed time set in advance. If the measured time is determined to be within the range of prescribed time, the information processing apparatus determines a task related to the one executed immediately before to be a next task to be executed among a plurality of tasks.

As described above, when the user makes a motion in attempting a keyboard input, without operating a menu, the information processing apparatus can switch to the mode for executing the comment insertion task. The user-desired task can thus be performed with high efficiency. If the user releases the hand from the keyboard in the foregoing environment, the information processing apparatus can hide the comment input field and switch to a mode for checking the external appearance after a lapse of prescribed time.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-184523, filed Sep. 17, 2015, which is hereby incorporated by reference herein in its entirety.

What is claimed is:

1. An information processing apparatus comprising:
a first identification unit configured to identify a type of an input device to be used to execute a task, the input device lying in a field of view range of a user wearing a display device;
a second identification unit configured to identify an operation medium with which the user operates the input device, the operation medium lying in the field of view range of the user;
a distance obtaining unit configured to obtain a first distance from the display device to the input device and a second distance from the display device to the operation medium;
a referring unit configured to refer to respective execution conditions for a plurality of tasks, wherein an execution condition for each task prescribes a type of an input device and an operation medium to be used and permissible ranges of a distance from the display device to the input device and a distance from the display device to the operation medium to execute the task;
a determination unit configured to determine a task for which the identified type of the input device, the identified operation medium, the first distance, and the second distance satisfy an execution condition for the task; and
a display control unit configured to cause the display device to display an image corresponding to the determined task.

2. The information processing apparatus according to claim 1, further comprising a detection unit configured to detect a position of the display device,
wherein the distance obtaining unit obtains the distances based on the position of the display device.

3. The information processing apparatus according to claim 1, further comprising an image obtainment unit configured to obtain a captured image of the field of view range of the user,
wherein the first identification unit identifies the type of the input device by performing template matching processing to the image.

4. The information processing apparatus according to claim 1, further comprising an image obtainment unit configured to obtain a captured image of the field of view range of the user,
wherein the second identification unit identifies a region having predetermined color information in the image as the operation medium.

5. The information processing apparatus according to claim 1, wherein the input device is a keyboard and the operation medium is the user's hand.

6. The information processing apparatus according to claim 1, wherein the processing is processing for inputting a character.

7. The information processing apparatus according to claim 1, wherein the display device is an optical see-through type display device or a video see-through type display device.

8. An information processing method comprising:
identifying a type of an input device to be used to execute a task, the input device lying in a field of view range of a user wearing a display device;
identifying an operation medium with which the user operates the input device, the operation medium lying in the field of view range of the user;
obtaining a first distance from the display device to the input device and a second distance from the display device to the operation medium;
referring to respective execution conditions for a plurality of tasks, wherein an execution condition for each task prescribes a type of an input device and an operation medium to be used and permissible ranges of a distance from the display device to the input device and a distance from the display device to the operation medium to execute the task;
determining a task for which the identified type of the input device, the identified operation medium, the first distance, and the second distance satisfy an execution condition for the task; and
causing the display device to display an image corresponding to the determined task.

9. The information processing method according to claim 8, further comprising detecting a position of the display device,
wherein the obtaining obtains the distances based on the position of the display device.

10. The information processing method according to claim 8, further comprising obtaining a captured image of the field of view range of the user,
wherein the identifying identifies the type of the input device by performing template matching processing to the image.

11. The information processing method according to claim 8, further comprising obtaining a captured image of the field of view range of the user, wherein the identifying identifies a region having predetermined color information in the image as the operation medium.

12. The information processing method according to claim 8, wherein the input device is a keyboard and the operation medium is the user's hand.

13. The information processing method according to claim 8, wherein the display device is an optical see-through type display device or a video see-through type display device.

14. A non-transitory computer-readable storage medium storing computer executable instructions for causing a computer to implement an information processing method, the information processing method comprising:
   identifying a type of an input device to be used to execute a task, the input device lying in a field of view range of a user wearing a display device;
   identifying an operation medium with which the user operates the input device, the operation medium lying in the field of view range of the user;
   obtaining a first distance from the display device to the input device and a second distance from the display device to the operation medium;
   referring to respective execution conditions for a plurality of tasks, wherein an execution condition for each task prescribes a type of an input device and an operation medium to be used and permissible ranges of a distance from the display device to the input device and a distance from the display device to the operation medium to execute the task;
   determining a task for which the identified type of the input device, the identified operation medium, the first distance, and the second distance satisfy an execution condition for the task; and
   causing the display device to display an image corresponding to the determined task.

15. The non-transitory computer-readable storage medium according to claim 14, further comprising detecting a position of the display device,
   wherein the obtaining obtains the distances based on the position of the display device.

16. The non-transitory computer-readable storage medium according to claim 14, further comprising obtaining a captured image of the field of view range of the user,
   wherein the identifying identifies the type of the input device by performing template matching processing to the image.

17. The non-transitory computer-readable storage medium according to claim 14, further comprising obtaining a captured image of the field of view range of the user,
   wherein the identifying identifies a region having predetermined color information in the image as the operation medium.

18. The non-transitory computer-readable storage medium according to claim 14, wherein the input device is a keyboard and the operation medium is the user's hand.

19. The non-transitory computer-readable storage medium according to claim 14, wherein the display device is an optical see-through type display device or a video see-through type display device.

* * * * *